United States Patent [19]

Myers

[11] 4,297,910
[45] Nov. 3, 1981

[54] TRANSMISSION GEAR SELECTOR CONTROL

[75] Inventor: Richard A. Myers, Livonia, Mich.

[73] Assignee: Ford Motor Company, Dearborn, Mich.

[21] Appl. No.: 76,117

[22] Filed: Sep. 17, 1979

[51] Int. Cl.³ .......................... G05G 9/12; G05G 5/02
[52] U.S. Cl. ................................... 74/473 R; 74/526
[58] Field of Search .............. 74/473 R, 473 SW, 475, 74/526

[56] References Cited

U.S. PATENT DOCUMENTS

| | | | |
|---|---|---|---|
| 1,241,415 | 9/1917 | Masury et al. | 74/473 X |
| 2,193,733 | 3/1940 | Maier | 74/473 R X |
| 2,245,714 | 6/1941 | Price et al. | 74/473 R |
| 2,839,945 | 6/1958 | Zion | 74/473 R |
| 3,473,403 | 10/1969 | Biro | 74/473 R |
| 3,646,828 | 3/1972 | Milton et al. | 74/484 |
| 3,962,930 | 6/1976 | Frazee | 74/473 R |
| 4,028,959 | 6/1977 | Long | 74/473 R |
| 4,060,157 | 11/1977 | Hillstrom | 74/473 R X |
| 4,068,540 | 1/1978 | Beckerman | 74/473 R X |
| 4,193,316 | 3/1980 | Kelbel | 74/477 |

FOREIGN PATENT DOCUMENTS 2062691 12/1970 Fed. Rep. of Germany.

Primary Examiner—Allan D. Herrmann
Attorney, Agent, or Firm—Frank G. McKenzie; Donald J. Harrington

[57] ABSTRACT

The gear selector shaft of a manually operated transmission has shift mechanisms secured thereto for producing driving engagement between the engine and the vehicle wheels at the speed ratio selected by the vehicle operator. By moving the selector shaft along shifting planes that are defined by a control plate, the shift mechanisms actuate the selected gear into engagement with the gears of the input shaft. The control plate has a system of interconnected slots into which a gear selector pin, which is secured to the gear selector shaft, is fitted. The slot system corresponds to the conventional shifting pattern over which the vehicle operator exercises control. The control plate serves to positively restrain erratic movement of the selector shaft that could cause damage to the transmission. A second embodiment provides for the gear selector shift control pattern to be secured to the selector shaft and its movement to be controlled by the movement of that pattern about the position of the selector pin. In this instance the pin is fixed to the transmission housing and similarly engages the slots that define the shifting pattern.

1 Claim, 4 Drawing Figures

TRANSMISSION GEAR SELECTOR CONTROL

BACKGROUND OF THE INVENTION

1. Field of the Invention

This invention relates to the control of a manually operated gear shifting mechanism and more particularly to such a control for regulating the movement of the gear selection shaft.

2. Description of the Prior Art

Front wheel drive motor vehicles of the transaxle type, wherein the engine and the transmission are positioned transversely with respect to the fore and aft axis of the motor vehicle, are known to cause uncertainty as to the actual speed ratio in which the transmission is operating. The vehicle operator has a less certain feedback from the transmission performance in relation to the position of the shift handle than with conventional longitudinal engine-transmission arrangements. Transaxle motor vehicle design requires that the transmission be located at a much more forward position in the vehicle than if the vehicle were of the in-line type. Conventional motor vehicles have the manual transmission positioned immediately below the gear selection shaft whose position is controlled by the vehicle operator. The response of the transmission to the control of the operator occurs over a relatively shorter path and therefore the operator has a more positive indication of the actual speed ratio in which the transmission is operating. Because of the greater structural stiffness of the connecting mechanism over shorter distance between the gear selector shaft and the transmission, the vehicle operator is given continual and accurate feedback of the relationship between the position of the selector shaft and the performance of the transmission.

On the other hand, manual transaxle vehicle design requires a distance of about three to four feet between the location of the selector shaft handle and the transmission that it controls. Because of the resultant structural deformation of the various load carrying members of the shifting mechanism and the tolerances associated with the numerous mechanical joints of the mechanism, the vehicle operator has a vague and uncertain indication of the speed ratio in which the transmission is operating. In addition to the greater length over which selector input must be transmitted in a transaxle vehicle, vehicles of this type are susceptible of fore and aft rotation of the engine and transmission assembly about the transverse vehicle axis. Rotation of this sort occurs because of variations which are continually occurring in normal vehicle operations. Movement of the assembly with respect to the vehicle chassis contributes to the vague and ambiguous indication given the vehicle operator of the relationship between the actual speed ratio in which the transmission is operating and the position of the shift handle whose position he controls.

A further contribution to the uncertainty associated with shift handle operation is the requirement in transaxle vehicles that fore and aft motion of the shift handle actually produce right-left motion of the shaft that transmits operator control input to the gear selector mechanism. Furthermore, right-left movement of the selector handle must cause the gear selector shaft to experience a rotary movement about its longitudinal axis in transaxle vehicles to maintain the conventional shifting pattern of the operator-controlled shift handle.

Conventional in-line engine transmission arrangements therefore have generally produced a positive and certain signal to the vehicle operator of the effect of the movement he produces on the shift handle and its relationship to the transmission performance. Transaxle vehicles on the other hand are encumbered by a vagueness in the feedback given the vehicle operator as a result of the control he exercises over the gear selector shaft.

SUMMARY OF THE INVENTION

To overcome the problem in manual transmission control for transaxle vehicle, the control according to this invention provides a specific and well defined path that restrains the movement of the gear selection shaft regardless of the movement variations the engine-transmission assembly may undergo in relation to the vehicle chassis.

A transmission selector plate made according to this invention provides a system of interconnected slots through the thickness of a control plate. The slots define the permitted paths along which the gear selector shaft may travel in response to motion of the gear selector handle produced by vehicle operator control. The selector shaft has engaged therewith the requisite gear selection mechanisms to actuate the various speed ratios and reverse gear operation of the transmission. An additional surface secured to the selector shaft provides a pin that extends radially outward from the axis of the selector shaft to engage the system of interconnected slots on the selector plate. The pin is securely held on the selector shaft against movement normal to the plane of the selector plate. Its in-plane movement is determined by the interconnected system of slots and the control forces exerted on the connector shaft by the operator. The control selector plate is securely fastened to the engine-transmission housing, which ultimately is resiliently mounted on the vehicle chassis.

In a second embodiment the control plate whose slots define the permissible selector shaft motion is fixed to the selector shaft. In this instance the selector pin is fixed to the transmission housing and similarly extends within the system of position control slots, but is restrained from movement of any kind with respect to transmission housing. Motion of the selector shaft is likewise limited by the extent to which the control system of slots permits the selector shaft to move in relation to the selector pin.

A principal object of this invention is provision of a simple and low cost control for positively defining the shifting paths over which the shifting handle may be moved by the vehicle operator.

A second object is to reduce the possibility of having the engaged gears becoming disengaged by reason of the uncontrolled movement of the shift handle relative to the transmission.

Another object of the shift control is to provide a clear and certain indication to the vehicle operator of the speed ratio in which the transmission is operating and to provide a constant position of the shift handle when the selected gear is engaged.

Still another object is to eliminate the need for adjustments to be made from time to time over the operating life of the vehicle to correct the external transmission controls so that the shifting planes through which the shift handle moves are set to conform to transmission performance and the gear ratios in which it operates.

DESCRIPTION OF THE PREFERRED EMBODIMENT

Figure 1:
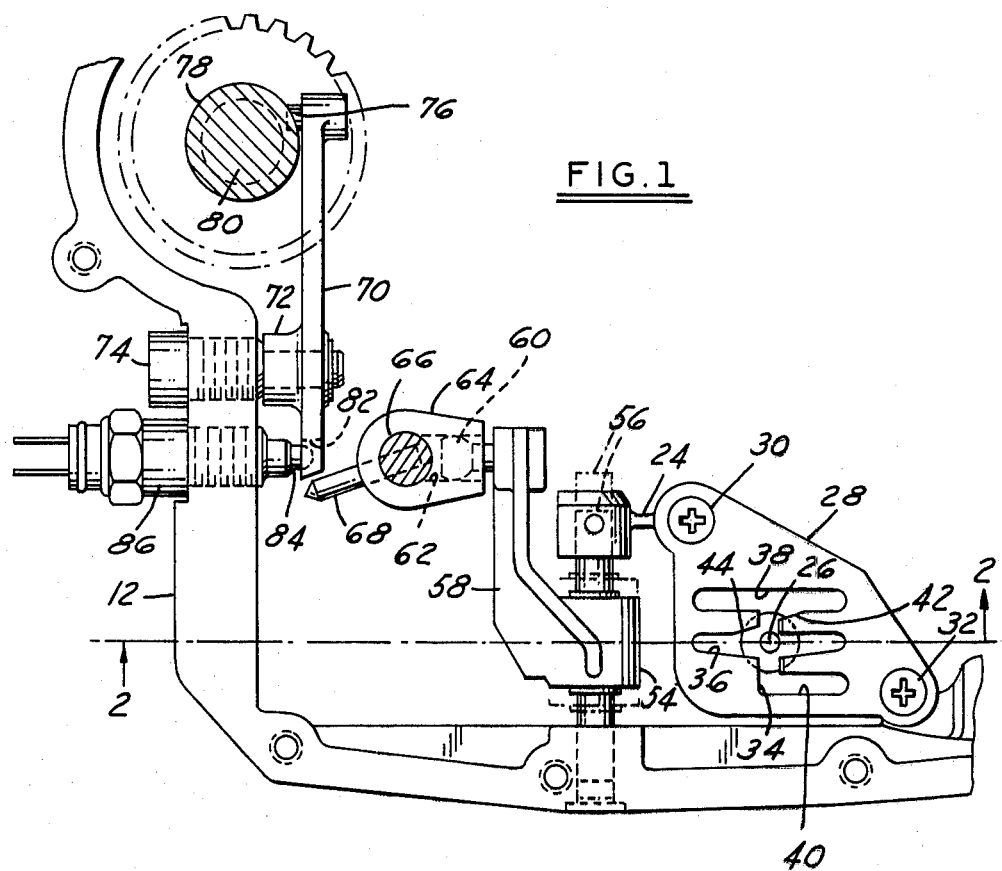
FIG. 1 is a side elevation view of a reverse gear shifting mechanism and the gear shift control regulating operation of the mechanism.
Figure 3:
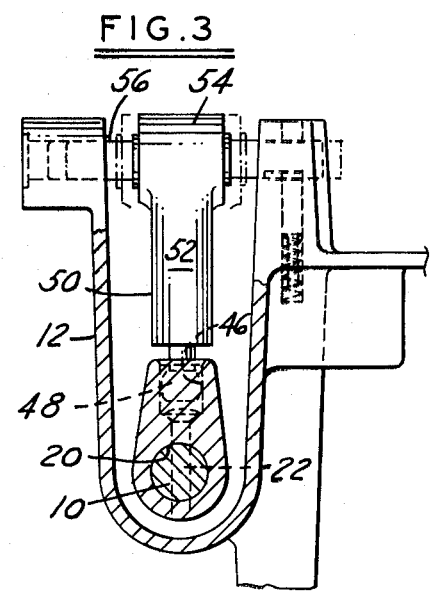
FIG. 3 is a cross-section taken at plane 3—3 of FIG. 2.
Figure 2:
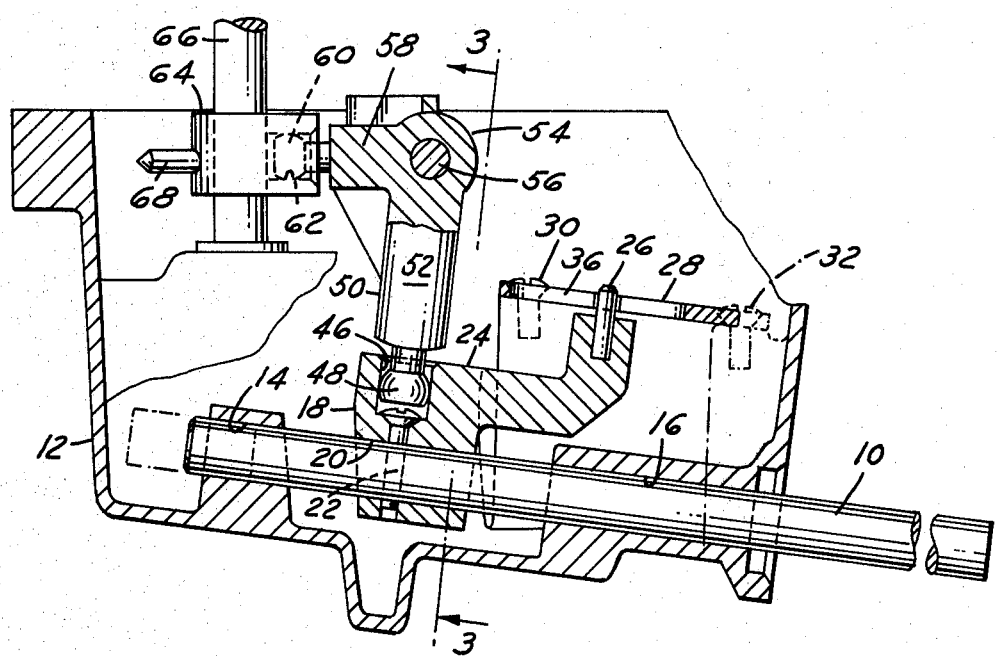
FIG. 2 is a cross-section taken at plane 2—2 of FIG. 1.

Referring first to FIGS. 1 and 2, the gear shift mechanism and control for a manually operated automotive transmission includes a gear selector shaft 10 whose position is controlled by the vehicle operator by way of a shift handle (not shown) that is connected to the shaft 10. The shifting lever is mounted on the transmission casing 12 within axial bores 14, 16, that permit both linear displacement of the shifting lever parallel to its longitudinal axis and rotation about the axis.

A control block 18 provides a cylindrical bore 20 through which the selector shaft passes and upon which the control block is secured by way of the roll pin 22. As best illustrated in FIG. 2, control block 18 provides an arm 24 that extends radially from the longitudinal axis of the shift lever. A selector pin 26 is mounted on the outer extremity of the arm 24.

Figure 4:
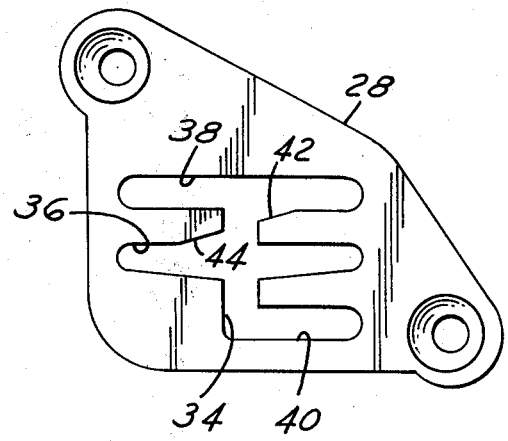
FIG. 4 is a plan view of the shift control plate according to this invention.

A selector control plate 28 is mounted on the transmission casing 12 by mounting screws 30,32. The planar surface of the control plate has an interconnected system of longitudinal slots formed therein into which system selector pin 26 is inserted and extends through the thickness of the control plate. The guide pin 26 is about 0.15 mm undersized in relation to the semi-circular extremities of slot 36. Its fit within the slots is sufficiently close so that the slot system provides a guide for the movement of the pin. However, because of rotation of the block 18 about the axis of selector shaft 10 the width of slots 38 and 40 is increased above that of slot 36 to accommodate the angular fit of pin 26 therewithin. The slot system of FIG. 4 is representative of a control gate system that would be used with a manually operated fourspeed transmission. A first slot 34 positioned transverse to the longitudinal axis of the shift lever 10 defines the neutral position for selector pin 26. A central intersecting slot 36 arranged so that its axis is parallel to the longitudinal axis of the shift lever defines the path of the selector pin between the first speed ratio and the second speed ratio position of the shift lever 10. At one extremity of the transverse slot 34, and intersecting slot 38 defines a path of travel between the third and fourth speed ratio positions of the selector shaft 10. At the opposite extremity of the transverse slot 34, a reverse slot 40 intersects with slot 34 and defines the path of motion of the selector pin 26 between the neutral gear position and reverse gear position of the shift lever 10. Slots 36, 38 and 40 are arranged in relation to the axis of the selector shaft such that linear displacement of the selector shaft produces selector pin travel between the first and second gear speed ratios when the selector pin is aligned with central slot 36, between the third and fourth speed ratios when the selector pin is aligned with slot 38, and between neutral and reverse gear positions when the selector pin is aligned with slot 40.

The ends of each of the longitudinal slots terminate in a semi-circular arc to facilitate the nesting of selector pin 26 at the extremity of the slots. This is a preferred condition and is the position of the pin when power is transmitted to the wheels. The slot system provides a chamfered corner 42 at the intersection of slot 34 and 38 and a second chamfered corner 44 at the intersection of slot 34 and 36. By eliminating the sharp corner at the intersection of these notches, movement of the selector pin 26 between the second and third speed ratio positions is facilitated. Maintaining the square corner at the intersection of the slots requires that the selector pin be moved in more rigorous paths between the longitudinal slots, which paths require a definite transverse motion parallel to the direction of slot 34. The square corner between the neutral position and the reverse slot is an example of the more definite path of travel for selector pin 26 between the neutral and reverse shift lever positions. The path is more definite than that between either the first speed ratio or second speed ratio positions because the edges of the slot are mutually parallel and intersect at right angles with slot 34. The squared corners at the intersecting slots of control plate 28 eliminate concurrent longitudinal and transverse movement of the shift handle by the vehicle operator. The chamfered corners permit simultaneous longitudinal and transverse shift handle movement that facilitates and speeds shifting between second and third speed ratios.

As an example of the control that plate 28 and pin 26 has over the gear selection mechanisms, the reverse gear selection characteristics are next described.

A control block 18 provides a bore 46 extending radially outward from longitudinal axis of selector shaft 10. The bore 46 is engaged by the extension 48 located at the end of arm 50 of bellcrank 52, which is journaled at boss 54 on shaft 56. Bellcrank 52 pivots about the axis of shaft 56 to which it is secured and the shaft can slide axially in bores of the transmission housing. The end of extension 48 is shaped to provide a truncated spherical radius that is sized to fit within the bore 46. A second arm 58 of bellcrank 52 extends radially outward from the axis of shaft 56 and similarly terminates in a truncated spherical radius element 60 that engages the cylindrical bore 62 of a second control block 64. Bore 62 extends radially outwardly from the longitudinal axis of a guide rail 66 upon which the second control block 64 is fixed. The support given block 64 by the guide rail 66 permits control block 64 to rotate about the axis of guide rail 66 and to displace linearly along the axis in response to the interaction of radius element 60 and bore 62. Engagement pin 68 is secured to control block 64 and extends radially outward from the axis of guide rail 66 opposite the direction of bore 62.

A reverse shift bellcrank 70 has a boss 72, which is mounted on the cylindrical surface of a mounting bolt 74 that is threaded into the wall of the transmission casing 12. One operating arm of bellcrank 70 terminates in a pin extending transverse to the length of the arm and engages the hub of a gear 78 slidably and rotatably mounted on shaft 80. The opposite arm of bellcrank 70 provides a longitudinal slot 82 into which the end of engagement pin 68 may be fitted. Slot 82 will also accept the end of a retractable pin 84, which is biased by a spring outwardly from housing 86 that is threaded into wall casing 12.

Retractable pin 84 by way of its engagement in slot 82 positively restrains bellcrank 70 from inadvertent rotation about the axis of mounting bolt 74 during movement of the shift mechanism other than when the reverse gear is selected. When reverse gear is selected, the shifting mechanism causes engagement pin 68 to rotate about the axis of rail 66 into engagement with slot 82, thereby displacing pin 84, which retracts within housing 86.

It can be seen that the gear shift mechanism so described will produce rotation of the second control block 64 about the guide rail 66 when selector shaft 10 is rotated about its longitudinal axis. Linear axial displacement of the selector shaft 10 ultimately produces linear movement of the guide rail 66. When engagement pin 68 has rotated into slot 82 thereby displacing retractable pin 84 from the slot, and when the control block 64 slides longitudinally with rail 66, bellcrank 70 is caused to rotate about its axis. This action causes gear 78 to slide axially on shaft 80 and into engagement with the selected gear of the transmission.

Since the selector shaft 10 has the capacity to move relative to the transmission casing either in rotation about its longitudinal axis or in translation along the axis, the vehicle operator could conceivably produce simultaneous rotation and translation of the shift lever. The concurrent application of rotation and translation is, however, inconsistent with the operation of the shifting mechanism. For example, when selecting reverse gear operation, it is essential that pin 68 be rotated into engagement with slot 82 before control block 64 is displaced axially along guide rail 68. Therefore, to produce this sequence first of rotation and later displacement, it is imperative that shift lever 10 be rotated about its axis before it is moved longitudinally. Furthermore, the full rotational motion must be completed before any substantial longitudinal displacement of selector shaft 10 occurs. Similarly, when selecting either first or second gear ratio operation immediately after concluding reverse gear operation, selector pin 26 must be moved first parallel to its longitudinal axis into the neutral slot 34 and then rotated causing pin 68 to disengage slot 82. Then, to engage either of the forward speed ratios shaft 10 is displaced transversely until pin 26 is aligned with either slot 36 or 38. Finally, shaft 10 is moved until the contour of pin 26 seats in the cylindrical surfaces at the extremity of the appropriate slot end. Gear shift control plate 28 eliminates the possibility that simultaneous rotation and displacement control movement of gear selector shaft 10 can occur. Movement of selector pin 26 within the system of slots necessitates that all gear shift lever motion be either substantially rotational or substantially translational. Neither motion can occur when the vehicle operator applies a force to the shift lever having components of rotation and displacement in approximately the same amount. The one qualified exception to this is during second-third speed ratio transition wherein the chamfered corners permit such dual control motion provided it is primarily translational. The slots intersecting as they do in mutually perpendicular arrangement require that the guide pin moves only in the direction of the slot. Any forces applied to the selector shaft that are not in the direction of the slot will be reacted by bearing engagement of the selector pin 26 on the wall of the respective slot. In this way a positive and predetermined shift lever movement is assured.

It should be recognized that the description of the operation of the shifting mechanism relates to the selection of the reverse gear operation only. Analogous gear shifting mechanisms capable of producing speed ratios one through four are similarly provided in manual transmissions of this kind. In addition, a manual transmission having more or less than four forward speed operating ratios can be accommodated with the present invention. For example, a fifth forward speed ratio is possible by extending the length of slot 40 beyond the transverse slot 34 to approximately the length of slots 36 and 38. When the selector pin 26 is positioned at the extremity of slot 40 opposite the position of the reverse gear as herein described, a fifth forward speed ratio can be selected.

I claim:

1. A transmission gear selector for controlling movement of a gear shift mechanism comprising:
   a gear selector shaft mounted for rotation and axial displacement;
   a selector pin fixed to the selector shaft extending outwardly therefrom;
   a first control block fixed to the selector shaft;
   a guide rail mounted for rotation about and axial displacement along an axis that extends transversely with respect to the selector shaft;
   a second control block fixed to the guide rail;
   a first bellcrank mounted for rotation about and axial displacement along an axis that extends transversely with respect to the selector shaft having one arm engaged in the first control block and a second arm engaged in the second control block, whereby axial movement and rotation of the selector shaft produce, respectively, axial movement and rotation of the guide rail;
   guide means defining paths of selector shaft movement within which means the selector pin is fitted to control the movement of the selector shaft and the guide rail;
   an engagement pin fixed to the guide rail and extending outwardly therefrom;
   a second bellcrank mounted for pivotal movement having one arm engageable by the engagement pin upon rotation of the guide rail, the pivotal movement of the second bellcrank resulting from axial movement of the guide rail; and
   a gear journalled on an idler shaft that extends substantially parallel to the axis of the guide rail and movable axially on the idler shaft in response to pivotal movement of the second bellcrank.

* * * * *